US007257245B2

(12) United States Patent
Oosawa

(10) Patent No.: US 7,257,245 B2
(45) Date of Patent: Aug. 14, 2007

(54) IMAGE POSITION MATCHING METHOD AND APPARATUS THEREFOR

(75) Inventor: Akira Oosawa, Kaisei-machi (JP)

(73) Assignee: Fujifilm Corporation, Tokyo (JP)

( * ) Notice: Subject to any disclaimer, the term of this patent is extended or adjusted under 35 U.S.C. 154(b) by 578 days.

(21) Appl. No.: 10/122,198

(22) Filed: Apr. 16, 2002

(65) Prior Publication Data

US 2003/0016853 A1     Jan. 23, 2003

(30) Foreign Application Priority Data

Apr. 26, 2001 (JP) ............................. 2001-129554

(51) Int. Cl.
*G06K 9/00* (2006.01)
*G06K 9/32* (2006.01)
(52) U.S. Cl. ...................... 382/132; 382/130; 382/294
(58) Field of Classification Search ............... 382/132, 382/130, 294
See application file for complete search history.

(56) References Cited

U.S. PATENT DOCUMENTS

| 4,899,393 | A | * | 2/1990 | Morishita et al. ........... 382/130 |
| 5,359,513 | A |   | 10/1994 | Kano et al. |
| 5,485,500 | A | * | 1/1996 | Baba et al. ................ 378/98.2 |
| 5,668,888 | A | * | 9/1997 | Doi et al. .................... 382/132 |
| 5,970,182 | A | * | 10/1999 | Goris .......................... 382/278 |
| 5,982,915 | A |   | 11/1999 | Doi et al. |
| 5,982,953 | A | * | 11/1999 | Yanagita et al. ............. 382/294 |
| 6,067,373 | A | * | 5/2000 | Ishida et al. ................ 382/130 |
| 6,594,378 | B1 | * | 7/2003 | Li et al. ..................... 382/130 |
| 2001/0002934 | A1 |   | 6/2001 | Oosawa |

FOREIGN PATENT DOCUMENTS

JP          11-342900          12/1999

OTHER PUBLICATIONS

Seunghwan Kim; Hyeon-Bong Pyo; Sang-Kyung Lee; Sooyeul Lee; Seon Hee Park, Digital Image Subtraction of Temporally Sequential Chest Images by Rib Elimination, Jul. 2000, Proceedings of the 22nd Annual International Conference of IEEE, vol. 3, pp. 1752-1755.*

* cited by examiner

*Primary Examiner*—Andrew W. Johns
*Assistant Examiner*—Anthony Mackowey
(74) *Attorney, Agent, or Firm*—Sughrue Mion, PLLC

(57) ABSTRACT

When position matching is performed on two images in which the soft tissue structures and the bone tissue structures are displaced in different directions, artifacts appearing in the subtraction image are reduced, and it becomes possible to perform the position matching according to the diagnostic objective or the preferences of the operator. A global position matching means that globally matches the positions of the entirety of two inputted images that have been obtained of the same subject, and a local position matching means that locally matches the positions of the two images that have been globally matched by the global position matching means are provided. The global position matching means has a function for performing a bone tissue structure global position matching process and a function for performing a non-bone tissue structure global position matching process. One of these two functions is selected and the global position matching is performed.

15 Claims, 14 Drawing Sheets

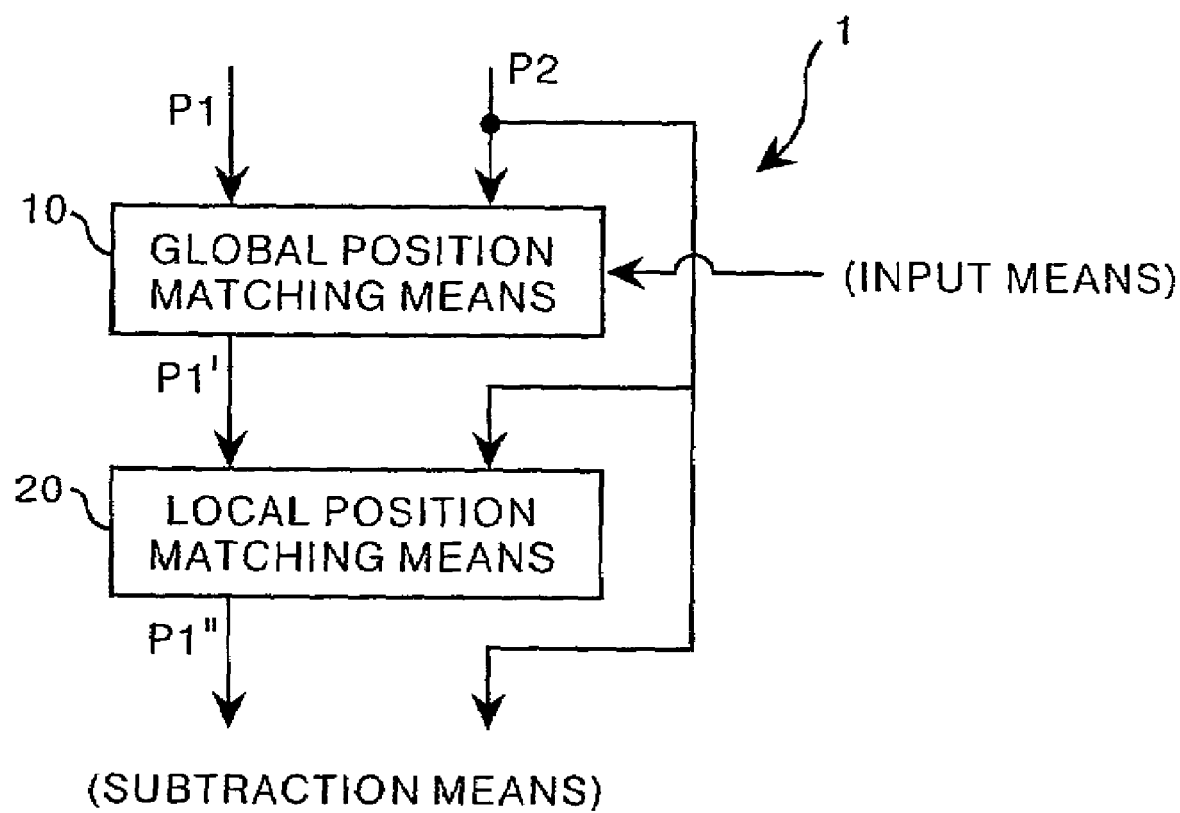

IMAGE POSITION MATCHING METHOD AND APPARATUS THEREFOR

BACKGROUND OF THE INVENTION

1. Field of the Invention

The present invention relates in general to an image position matching method and apparatus therefor, and in particular to an improved method and apparatus for matching the positions between two images obtained of the same subject.

2. Description of the Related Art

It is a common practice in a wide variety of fields to comparatively read two or more images obtained of the same subject in order to discern the difference between the images, and then carry out an examination of the subject based on the thus discerned difference.

In the industrial products manufacturing field, for example, images obtained of a product when it is new and images obtained of the same product after it has been subjected to an endurance test are comparatively read, and attention is focused on the area showing the biggest difference so that an examination as to whether or not there are areas requiring improvement in product endurance can be carried out. Further, in the medical field, physicians comparatively read a plurality of radiation images of the diseased part of a patient, which have been obtained in a temporal series, in order to ascertain the progression of the disease and determine the proper course of treatment.

In this fashion, comparative reading of a plurality of images is carried out daily in a wide variety of fields. In general, two or more images are outputted as visual images by a display apparatus, a printer or the like, and these outputted visual images are arranged next to each other and comparatively read. At this time, the area of the most interest to the observer of such images is the area wherein the greatest difference is present, However, the proficiency in discerning the difference between the images in a comparative reading differs depending on the skill level and experience of the examiner; moreover, the smaller said difference is, the more difficult it becomes to discern. Therefore, there are calls for an improvement, which does not rely on the skill level of the examiner, in the performance of comparative reading.

In general, an interimage process, starting with a subtraction process performed between the structural positions (anatomically characteristic positions) of the two images that are the objects of comparative reading, is performed, and the difference between the images (hereinafter referred to as the interimage difference) is extracted and then enhanced (see Japanese Patent Application No. 11(1999)-342900). In this fashion, by extracting and enhancing only the interimage difference, because it is thereby made possible for a reader thereof to accurately recognize the interimage difference, it can be considered an effective means of preventing the oversight of a diseased portion or the progression of a disease.

Further, when this interimage process is performed, it is necessary that the respective position of each structural element (the structural positions) appearing in each image be correlated and matched. As to this position matching technology, there are two-step position matching technologies, for example, wherein: the positions of the entirety of two images are matched by moving the two images in parallel, rotating, or magnifying the images (e.g., a linear position matching employing an affine transform); a plurality of regions of interest (template regions) are set in one of the two images that has been subjected to the global position matching; a search region, which is larger than the template region, corresponding to each template region is set in the other of the aforementioned two images; a portion region (a corresponding template region), which is within the search region and which substantially matches the image appearing within said corresponding template region, is obtained for each group formed of a template region and the search region corresponding thereto; a shift quantity for matching the template region occurring in said one of said two images to the corresponding template region in the other of said two images is obtained, based on the positional relation between each template region occurring in one of said two images to each corresponding template region in the other of said two images; and a local position matching process is performed, by use of a non-linear transform (warping) employing a curve fitting process (a two dimensional n polynomial, wherein $n \geq 2$) on the two images of which the structural positions thereof have been matched (see Japanese Unexamined Patent Publication No. 7(1996)-37074, U.S. Pat. No. 5,982,915, etc.). According to these two-step position matching technologies, the structural positions occurring in two images can be matched comparatively favorably.

However, in images such as radiation images of the rib cage of a human patient, for example, in which bone tissues such as the ribs, vertebrae and the like, and the soft tissues such as muscle tissue, organs and the like are contained in the same image, there are cases in which, corresponding to changes in the orientation (standing position, inclination, etc.) of the subject of photographing (a human body) during the photographing thereof, the positional orientation of the bone tissue structures and the soft tissue structures shown in the images is different. Conventionally, for cases in which the bone tissue structures and the soft tissue structures shown in two images are displaced in different directions, a position matching process in which the positions of the entirety of the subject images are matched, such as that described above, is performed utilizing an original image (or a reduction image of the original image, a blurred image of the original image, etc.), whereby an image in which the positions of the soft tissue structures have been globally matched. However, if a local position matching process such as that described above is performed utilizing an image in which the positions of the soft tissue structures have been globally matched, there are cases in which ribs appearing in a template region do not appear in the corresponding search area; as a result, artifacts caused by an extraordinarily large positional misalignment between the ribs have appeared in the subtraction image (an image obtained by extracting and enhancing the difference between two images), which is formed after the local position matching process, which is the index process by which the positions of the ribs are matched, has been performed.

Meanwhile, because it is generally desirable that an image in which the positions of the soft tissue structures have been accurately matched be used for extracting a diseased portion present in the soft tissue structures, and that an image in which the bone tissue structures have been accurately matched be used for extracting a diseased portion present in the bone tissue structures, depending on the diagnostic objective, there are cases for which it is preferable, even if artifacts of the ribs (bone tissue structures) appear in a subtraction image, that the global matching be performed on the soft tissue structures.

SUMMARY OF THE INVENTION

The present invention has been developed in view of the foregoing circumstances, and it is a primary object of the present invention to provide an image position matching method and apparatus therefor which are capable of reducing the artifacts appearing in a subtraction image when position matching is performed between two images in which the anatomically characteristic positions (the soft tissue structures and the bone tissue structures) appearing therein are displaced in different directions, and of performing the position matching in accordance with the diagnostic objective or the preferences specified by an operator.

According to the image position matching method of the present invention: a global matching of the positions appearing in the entirety of two images obtained of the same subject is performed therebetween; and the two images thus subjected to global matching are then subjected to a local position matching; wherein, the global position matching is a position matching process focusing mainly on the bone tissue structures appearing in the images.

Further, according to another image position matching method of the present invention: a global matching of the positions appearing in the entirety of two images obtained of the same subject is performed therebetween; and the two images thus subjected to global matching are then subjected to a local position matching; wherein, it is possible to select between a position matching process focusing mainly on the bone tissue structures and a position matching process not focusing mainly on the bone tissue structures appearing in the images, and the global position matching is performed according to the selected position matching process.

Here, the phrase "a position matching process focusing mainly on the bone tissue structures" refers to a prioritization wherein the position matching is to be performed on the bone tissue structures included in the images more than on the soft tissue structures (the shadows). That is to say, that the bone tissue structures are to be concentrated on and the positions therebetween matched with a higher degree of accuracy. Further, the phrase "a position matching process not focusing mainly on the bone tissue structures" refers to, a position matching process performed not concentrating on the bone tissue structures (i.e., without a prioritization of the bone tissue structures), regardless of whether or not the positions of the bone tissue structures are accurately matched as a result; wherein, position matching processes prioritizing the soft tissue structures are included therein.

As to the global position matching process, a process wherein at least one of the two images to be globally matched is subjected to at least one linear transform (an affine transform or the like) from among being rotated, moved in parallel and enlarged or reduced, or a rough non-linear transform wherein the structural positions appearing in the two images are globally matched can be adopted.

The phrase "local position matching process" refers to a process of subjecting the two images that have been subjected to the global position matching process to a further, local position matching process (matching each corresponding portion region within the two images): for example; template regions, which are a plurality of small regions, are set for one of the two images subjected to the global position matching process; a search region, which is larger than each template region, corresponding to each respective template region is set for the other of the aforementioned two images; a portion region that substantially matches the image of the corresponding template region is obtained within each search region; and the entirety of at least one of the two images subjected to position matching is subjected, based on the positional relation between each template region and each portion region, to a non-linear transform process (e.g., a non-linear transform performed by a curve fitting employing a two-dimensional polynomial) so that both of said two images are substantially matched.

Further, the position matching process focusing mainly on the bone tissue structures can be a process performed using a bone tissue structure image in which the focus is mainly on the bone tissue structures appearing within an image. Note that this does not mean that only the bone tissue structure image is used.

Here, the referents of "bone tissue structure image" include images in which the representation of the bone tissue structures has been prioritized higher than that of other tissue structures (shadows), and images in which the bone tissue structures can be focused on more than other tissue structures: for example; an image in which the bone tissue structures have been emphasized or extracted.

Further, the aforementioned global position matching process can be a process wherein two images obtained of the same subject are reduced (by thinning out, average reduction, or the like) and the reduced images obtained thereby are subjected to the global position matching process. The image position matching apparatus according to the present invention comprises: a global position matching means that globally matches the structural positions of the entirety of two images that have been obtained of the same subject; and a local position matching means that locally matches the structural positions of the two images that have been subjected to the global position matching process by the global position matching means; wherein, the global position matching means is provided with a bone tissue structures position matching function for performing the global position matching process in a manner focusing mainly on the bone tissue structures.

Still further, the global position matching means is provided with a non-bone tissue structures position matching function for performing the global position matching process in a manner focusing mainly on the tissue structures other than the bone tissue structures; the global position matching means can further be provided with a selecting means for selecting between the bone tissue structures position matching function and the non-bone tissue structures position matching function when the global position matching process is to be performed.

Here, as to the selecting means: a selecting means provided as a separate input means that has a function for selecting, based on the data inputted thereto, either of the position matching functions; an automatic selecting means that automatically determines the types of positions included in the two images to be subjected to the global position matching process, and automatically selects, based on said determined positions, the global position matching function; or the like, can be employed therefor. Note that the referents of "data" in "a separate input means that has a function for selecting, based on the data inputted thereto" can include the diagnostic objective or the diseased position, the preferences of the operator, and other types of data pertaining to the selecting of the global position matching function.

Further, the bone tissue structures position matching function of the global position matching process can be a function for performing the global position matching process by use of a bone tissue structures image representing the bone tissue structures appearing in the images. Note that this does not mean that only the bone tissue structures image is used.

Still further, for cases in which the images to be subjected to the image position matching process are chest X-ray images, the bone tissue structures position matching function can be a function that matches, in the vertical direction of the image, the positions of the ribs appearing within the images. At this time, global position matching in a direction within the image other than the vertical direction can be performed in a manner not focusing on the bone tissue structures. Note that in the case of chest X-ray images, the phrase "in the vertical direction of the image" refers to the direction of the substantially upper and lower portions of the rib cage appearing in the image (the direction parallel to that of the spinal column); that is, does not refer to the upper and lower directions of the entire image. Further, the phrase "global position matching in a direction within the image other than the vertical direction" refers to a global position matching process other than a vertical global position matching process; for example, a horizontal (left-right) position matching process, a rotational position matching process, or the like.

Additionally, the bone tissue structure position matching function can be a function for performing the global position matching on the ribs by use of a bone tissue structure image representing the ribs, which have been enhanced, appearing within the image.

In addition, this ribs enhanced image can be an image formed by use of a mask, which has the same directionality as the ribs within the chest X-ray image, for detecting the linear shadows within said chest X-ray image.

Here, as to the mask for detecting the linear shadows, any number of types of masks, such as a mask formed using a real part of a Gabor function, can be employed thereas. Note that because the directionality of the ribs is not limited to being unidirectional, it is desirable that a plurality of masks having a variety of different directionalities, matched to the directionality of each portion of the ribs, be used for detecting the linear shadows.

Further, according to the image position matching apparatus of the present invention: the bone tissue structures position matching function can set a template region in one of the two images; the normalized cross-correlation value of the pixel value of the pixels in the set template region and the pixel value of each pixel in the portion region, within the other of the two images, corresponding to the template region can be computed by separately changing the weighting of the pixel value of each pixel in the set template region in the one image and the pixel value of each pixel in the portion region, within the other of the aforementioned two images, corresponding to the template region, onto the portion region within the template region; and the global position matching carried out based on the computed normalized cross-correlation value. In addition, for cases in which the two images to be processed are chest X-ray images, the aforementioned normalized cross-correlation value can be computed by weighting the portion regions including the ribs present in the template regions more, and weighting the portion regions not including the ribs present in the template regions less.

Still further, the global position matching process can be a process wherein two images obtained of the same subject are reduced (by thinning out, average reduction, or the like) and the reduced images obtained thereby are subjected to the global position matching process.

Additionally, the aforementioned two images can be two images obtained at different points in time in a temporal series.

According to the image position matching method and apparatus of the present invention, because the global position matching process (position matching of the entirety of the images) can be performed in a manner wherein the bone tissue structures appearing in the two images are mainly focused on, it becomes possible to obtain as the result of matching the positions of the entirety of the aforementioned two images an image wherein the bone tissue structures have been matched; whereby it becomes possible to improve the accuracy of the local position matching, in which the bone tissue structures are utilized as the index therefor, after the global position matching process has been completed. That is to say, if an image wherein the positions of bone tissue structures have been matched can be obtained as the result of the matching the positions of the entirety of two images, even for cases in which the position matching processes are performed on two images between which the positions of the soft tissue structures and bone tissue structures are displaced in different directions, when the local position matching process is performed, the possibility that a portion region (a corresponding template region) corresponding to the template region is present within the search region corresponding to the template region becomes higher; therefore, the accuracy of the local position matching process is improved, and the artifacts appearing within a subtraction image can be reduced.

Further, if it is possible to select between a bone tissue structures position matching process or the non-bone tissue structures position matching process, and the global position matching process is performed by the selected process, it becomes possible to switch the global position matching process between the bone tissue structures position matching process and the non-bone tissue structures position matching process, in accordance with the preferences of the operator or the diagnostic objective, leading to a further improvement of the diagnostic performance. That is to say, because it is desirable that an image in which the positions of the soft tissue structures have been accurately matched be used for extracting diseased portions present within the soft tissue structures, and that an image in which the positions of the bone tissue structures have been accurately matched be used for extracting diseased portions present within the bone tissue structures, if it is made possible to select between whether the bone tissue structures are to be focused on or not focused on, in accordance with the diagnostic objective or the like, it can be considered to lead to an improvement in the diagnostic performance.

Note that for cases in which the images to be subjected to the position matching process are chest X-ray images, the global position matching can be performed more accurately if carried out with respect to the ribs and in the vertical direction (the direction substantially parallel to the spinal column).

Further, if template regions are set in one of the two images to be subjected to the position matching process, and the normalized cross-correlation values of the pixel values of each pixel occurring in the set template regions and the pixel values of each pixel occurring within the portion region, corresponding to each template region, in the other of the aforementioned two images, are calculated, for cases in which the global position matching process is performed, on the aforementioned two images, by changing the weighting occurring when the normalized cross-correlation values are computed for each separate portion region within the template regions, based on the computed normalized cross-correlation values, there are cases for which the accuracy of the matching of the positions can be even further improved.

In a case, for example, in which the two images to be processed are chest X-ray images, if the positions of a template region in which bone tissue structures are present are weighted more, and the positions of a template region in which bone tissue structures are not present are weighted less, and then the normalized cross-correlation value is computed, a result in which the accuracy of the position matching is highly accurate can be obtained.

BRIEF DESCRIPTION OF THE DRAWINGS

FIG. 1 is a block diagram of an embodiment of the image position matching apparatus according to the present invention.

DESCRIPTION OF THE PREFERRED EMBODIMENTS

Hereinafter, the preferred embodiments of the image position matching method and apparatus according to the present invention will be explained with reference to the attached drawings. FIG. 1 is a block diagram of an embodiment of the image position matching apparatus according to the present invention, and FIGS. 2A and 2B are drawings of two chest X-ray images that have been obtained at different points in time of the same subject.

Figure 2B:
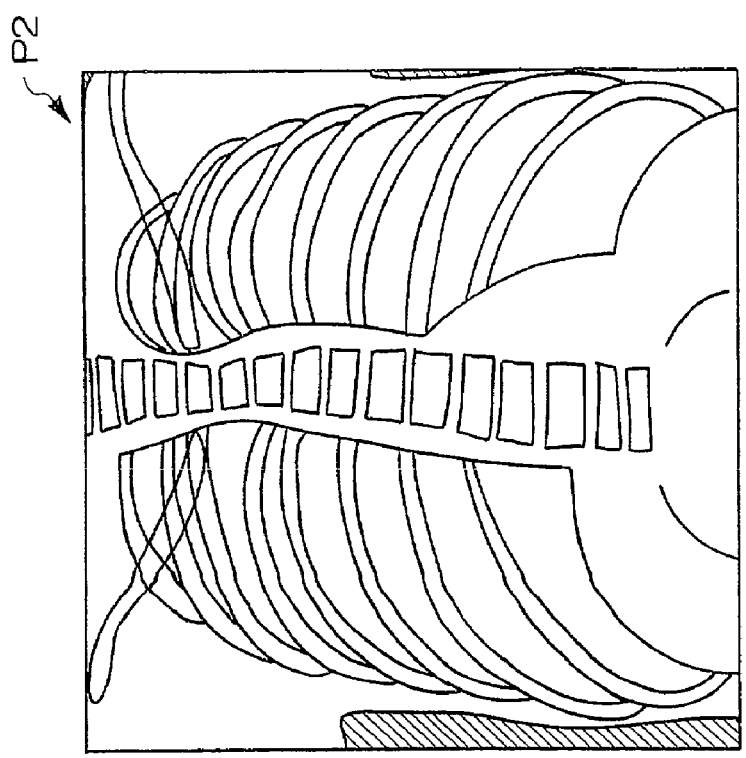
FIGS. 2A and 2B are drawings of two images to be subjected to the position matching process by the embodiment of the image position matching apparatus shown in FIG. 1.
Figure 2A:
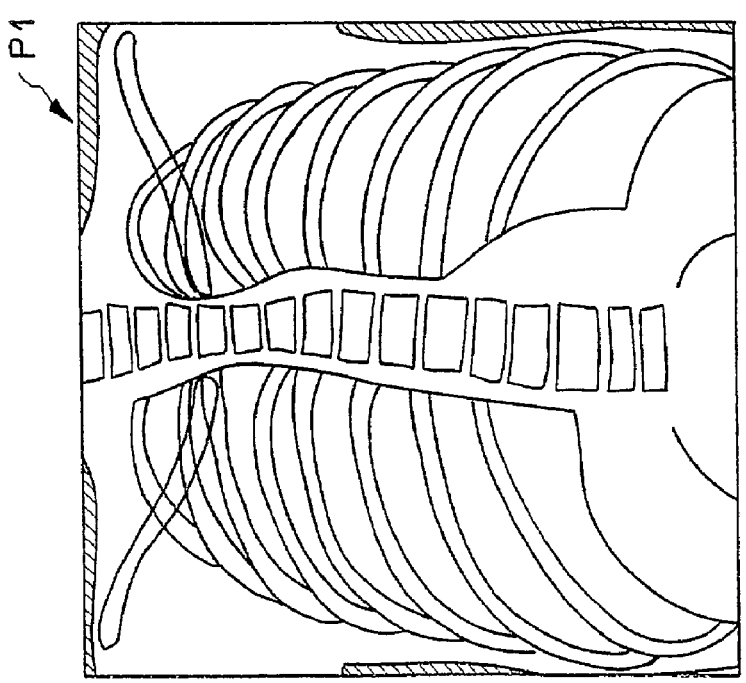

The two images shown in FIGS. 2A and 2B are images of which a subtraction image is to be obtained by correlating the pixels of one of said two images to the pixels of the other of said two images and performing a subtraction process therebetween: FIG. 2A shows a past image P1' that has been obtained in a past examination; and FIG. 2B shows a current image P2 that has been obtained during the current examination.

The position matching apparatus 1 comprises: a global position matching means 10 that globally matches the positions of the entirety of two inputted images, P1 and P2; and a local position matching means 20, into which the images P1' and P2 have been inputted after being subjected to the global position matching process by the global position matching means 10, that locally matches the positions of said inputted images P1' and P2.

Further, according to the position matching apparatus 1: the global position matching means 10 is provided with an input means for inputting data required for selecting the position matching function to be employed when a position matching operation is performed; and is connected to a subtraction means that performs a subtraction process on the two images that have been locally matched by the local position matching means 20. Note that the referents of "data required for selecting the position matching function" include the preferences, regarding the performance of the position matching, of the operator, the diagnostic objective, the position of the diseased portion (bone tissue structure regions, soft tissue structure regions), or the like.

Figure 3:
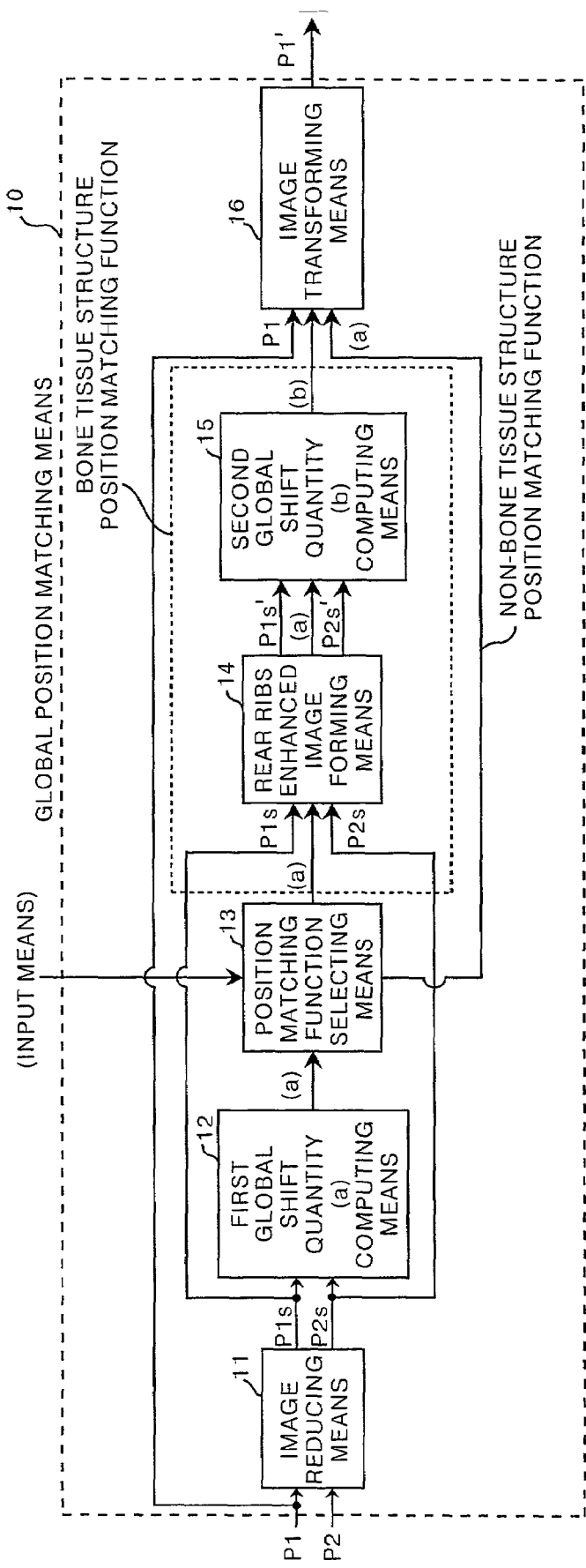
FIG. 3 is a detailed block drawing of the global position matching means of the embodiment of the image position matching apparatus shown in FIG. 1.

The global position matching means 10 is provided with a bone tissue structure position matching function for matching the positions in a manner focusing mainly on the bone tissue structures appearing in the images, and a non-bone tissue structure position matching function for matching the positions in a manner not focusing mainly on the bone tissue structures; either of the position matching functions is selected, based on the data inputted at the input means, and the global position matching is performed. More specifically, as shown in FIG. 3, the global position matching means 10 comprises: an image reducing means 11 that reduces each of the two inputted images, P1 and P2, to a 1/10 size image; a first global shift quantity (a) computing means 12, into which the images that have been reduced by the image reducing means 11, reduced images P1s and P2s, are inputted, that computes a first global shift quantity (a); a position matching function selecting means 13 that selects a position matching function, based on the data inputted by the input means; a post-costal enhanced image forming means 14 that forms, for cases in which the bone tissue structure position matching function has been selected by the position matching function selecting means 13, a post-costal enhanced image of each of reduced images P1s and P2s; and a second global shift quantity (b) computing means 15, into which the two post-costal enhanced images, post-costal enhanced images P1s' and P2s', are inputted, that computes a second global shift quantity (b); further comprising an image transforming means 16, into which the second global shift quantity (b) and the past image P1 are input for cases in which the bone tissue structure position matching function has been selected by the position matching function selecting means 13, and into which the first global shift quantity (a) and the past image P1 are input for cases in which the non-bone tissue structure position matching function has been selected, that performs, based on the first global shift quantity (a) or the second global shift quantity (b), an affine transform, by rotating, moving parallel, magnifying, or the like, the entire past image P1. Note that the operation of each means included in the global position matching means 10 will be explained below.

The local position matching mean 20 is a means for performing a local position matching of the structural positions contained within the outline of the rib cage included in the two images, P1' and P2, which have been globally matched by the global position matching means 10, and subjects the entirety of the past image P1' to a non-linear transform (warping) to obtain two images, P1" and P2, of which the structural positions have been matched for use in subtraction.

Figure 4:
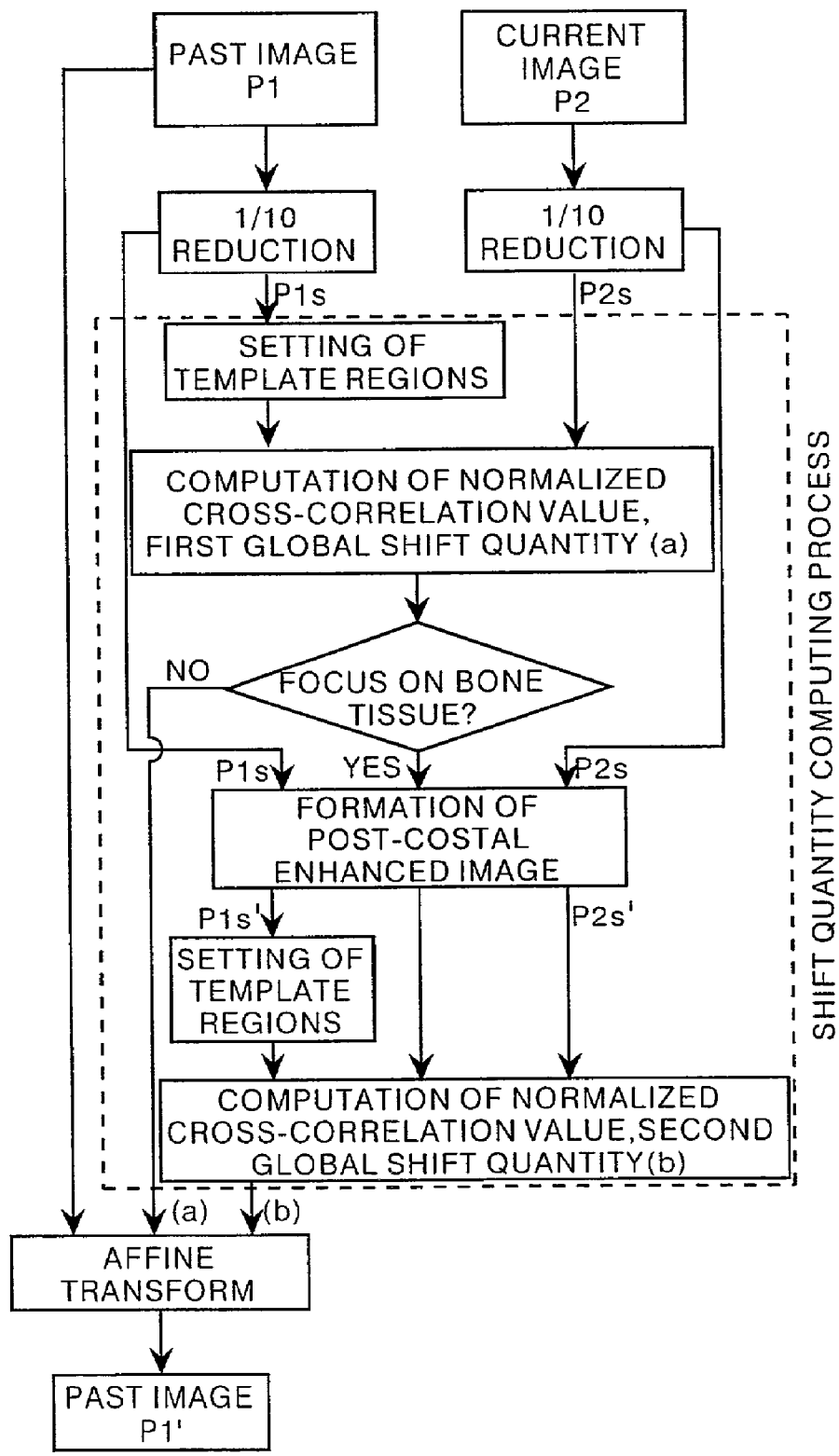
FIG. 4 is a flowchart showing the details of the global position matching process.

Next, the operation of the image position matching apparatus according to the current embodiment will be explained. FIG. 4 is a flowchart of the operation global position matching process performed by the global position matching means 10 according to the position matching apparatus 1 of the current embodiment.

Upon the input of the past image P1 and the current image P2 to the image reducing means 11 of the global position matching means 10, both of images P1 and P2 are reduced to 1/10 size images, and the process whereby the shift quantity employed in the global matching process is computed is performed.

Figure 5A:
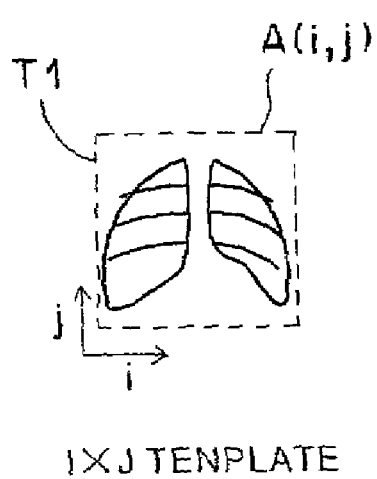
FIGS. 5A and 5B are drawings illustrating the operation occurring when the global shift quantity is computed.
Figure 5B:
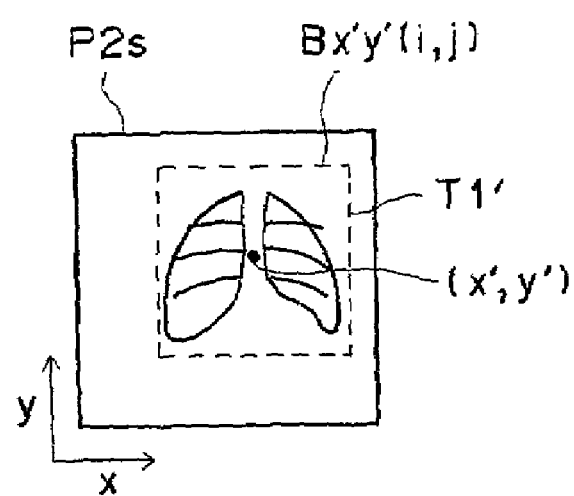

In the image reducing means 11, upon the input of the reduced images P1s and P2s into the first global shift quantity (a) computing means 12, as shown in FIG. 5, rectangular regions substantially contained within the portion of the reduced image P1' of the past image P1 contained within outline of the rib cage portion included therein are set as template regions T1 (at a size of I×J). These template regions can be set as rectangular regions centered on the center point of the entire image, or the outline of the rib cage region can be discerned, by use of the method described in Japanese Unexamined Patent Publication 2000-298100, and the template region can be set as a rectangular region enclosing the discerned outline of the rib cage region. Further, the first global shift quantity (a) computing means 12 rotates, moves parallel, etc. these template regions within the reduced image P2 of the past image P2s to obtain the normalized cross-correlation value occurring at each position; the shift quantity of the position having the highest normalized cross-correlation value is computed as the first global shift quantity (a: ΔX1, ΔY1, Δθ1). If the region correlating to the template region and having a size of I×J within the reduced image P2s of the current image P2 is taken as a corresponding template region T1', this first global shift quantity (a) can be obtained from the positional relation of the center position of the template region T1 and the center position of the corresponding template region T1' corresponding to the position having the highest normalized cross-correlation value.

Note that as to the normalized cross-correlation value, a formalized mutual correlation value is utilized, wherein the higher said value is, the higher the degree of matching of the positions is. That is to say, if the pixel value of each of the pixels within the template region T1 is designated as A (i, j) and the pixel value of each of the corresponding pixels within the corresponding template region T1' is designated as Bx' y' (i, j), the normalized cross-correlation value of the normalized cross-correlation value is computed according to the following formula (1):

$$Cx'y' = \sum_{j=1}^{J} \sum_{i=1}^{I} \frac{\{A(i, j) - a_m\}\{Bx'y'(i, j) - b_m\}}{\sigma_a \cdot \sigma_b}$$

Wherein:

-continued $$a_m = \frac{1}{I \cdot J} \sum_{j=1}^{J} \sum_{i=1}^{I} A(i, j)$$

$$b_m = \frac{1}{I \cdot J} \sum_{j=1}^{J} \sum_{i=1}^{I} Bx'y'(i, j)$$

$$\sigma_a^2 = \frac{1}{I \cdot J} \sum_{j=1}^{J} \sum_{i=1}^{I} \{A(i, j) - a_m\}^2$$

$$\sigma_b^2 = \frac{1}{I \cdot J} \sum_{j=1}^{J} \sum_{i=1}^{I} \{Bx'y'(i, j) - b_m\}^2$$

For cases in which the non-bone tissue structure position matching function has been selected at the position matching function selecting means 13, the image transforming means 16 performs, based on the computed first global shift quantity (a), an affine transform on the past image P1, and forms a past image P1', wherein the bone tissue structures have not been focused on and of which the structural positions have been substantially matched to those of the current image P2. Note that the past image P1' that has been matched to the current image P2, without having have been formed in a manner wherein the bone tissue structures contained therein are focused on, is the equivalent of an image that has been formed in a manner wherein the soft tissue structures are focused on.

Meanwhile, for cases in which the bone tissue structures position matching function has been selected the position matching function selecting means 13, the two reduced images P1s and P2s are inputted to the post-costal enhanced image forming means 14 and two post-costal enhanced images, P1s' and P2s' are formed. Further, the two post-costal enhanced images, P1s' and P2s' formed by the post-costal enhanced image forming means 14 are inputted to the second global shift quantity (b) computing means 15, wherein the second global shift quantity (b) is computed.

Figure 6:
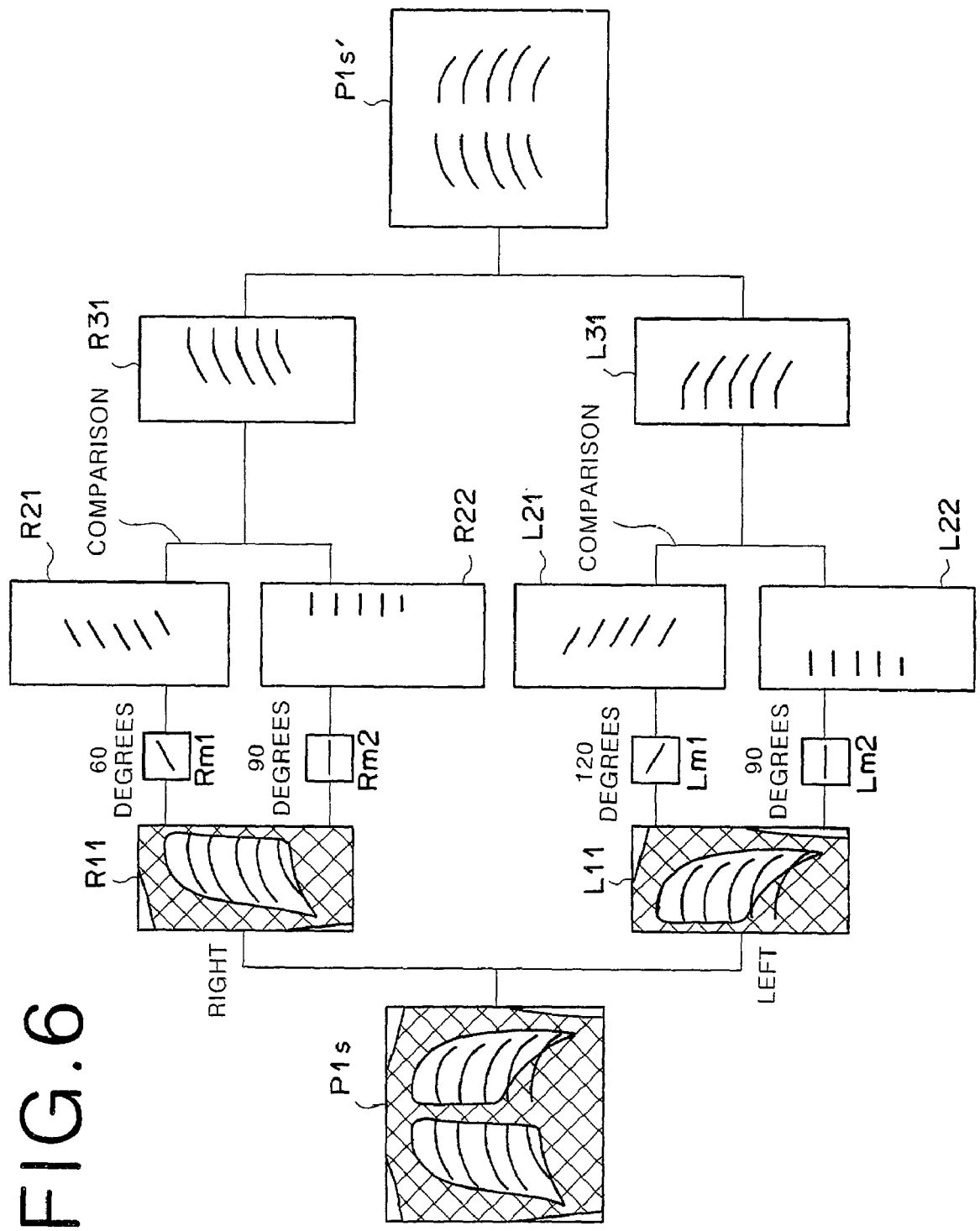
FIG. 6 is a block diagram illustrating the method of forming a post costal enhanced image.

FIG. 6 is a block diagram illustrating the operation occurring when a post-costal enhanced image is to be formed in the post-costal enhanced image forming means 14. Note that here, for the sake of simplicity, an explanation will be provided taking a high density, high pixel value image as an example; however, in actuality there are many cases in which a high brightness, high pixel value image will be used.

The post-costal enhanced image is formed using a detection mask that detects straight lines of a specified directionality, and by extracting only the shadows of the post-costal included in the chest X-ray image. More specifically, as shown in FIG. 6, in chest X-ray images (e.g., a past image P1 and a reduced image P1s), because there are many cases in which the post-costal present in the right side image R11 have a directionality of 60 and 90 degrees, and the post-costal present in the left side image L11 have a directionality of 120 and 90 degrees, the right side image R11 is subjected to a convolution process using a mask Rm1 having a direction of 60 degrees and a mask Rm2 having a direction of 90 degrees, and the left side image L11 is subjected to a convolution process using a mask Lm1 having a direction of 120 degrees and a mask Lm2 having a direction of 90 degrees. If the image is formed from only each of the components that are larger than 0, images R21, R22, L21, and L22, representing only the extracted shadows, which have the same directionality as the respective masks, are obtained. Further, if an image is formed from the two images R21 and R22 formed from the right side image R11 or the two images L21 and L22 formed from the left side image L11, by comparing the pixel values of the pixels of the same position in each image between the respective pairs and selecting the highest pixel value, an image R31, which represents the extracted post-costal that were present in the right side image R11, and an image L31, which represents the extracted post-costal that were present in the right side image extracted, can be obtained. Also, by matching the two images R31 and L31, left and right, representing the respective extracted post-costal, a post-costal enhanced image P1s' is formed.

Here, the mask that detects straight lines having a predetermined directionality is formed by the real part (Formula (3), below) of the Gabor function shown in the Formula (2) below:

$$\varphi(x, y) = \exp\left[-\frac{\omega_0^2}{2\pi^2}(x^2 + y^2)\right] \cdot \exp[j(k_x \cdot x + k_y \cdot y)] \qquad (2)$$

$$= \exp\left[-\frac{\omega_0^2}{2\pi^2}(x^2 + y^2)\right] \cdot \cos(k_x \cdot x + k_y \cdot y) + \qquad (3)$$

$$j \cdot \exp\left[-\frac{\omega_0^2}{2\pi^2}(x^2 + y^2)\right] \cdot \sin(k_x \cdot x + k_y \cdot y)$$

Wherein:

$\omega_0$: the size of the mask $(k_x, k_y)$: variables that determine the direction The post-costal enhanced image forming means 14 forms a post-costal enhanced images P1s' and P2s' for each of reduced image P1s of the past image P1 and the reduced image P2s of the current image P2, and upon the input of these post-costal enhanced images P1s' and P2s' to the second global shift quantity (b) computing means 15, a rectangular region substantially including the center of the rib cage outline portion of the post-costal enhanced image P1s' of the past image P1 is set as a template region 2, in the same manner as occurred in the computation of the first global shift quantity (a). Further, this template region T2 is moved in parallel only in the Y direction (the Y direction after the shift ΔX1, Δθ1) within the post-costal enhanced image P2s' of the current image P2 and the normalized cross-correlation value at each position is obtained; the shift quantity of the position having the largest normalized cross-correlation value is computed as the second global shift quantity (b: ΔX2, ΔY2, Δθ1). Note that in the first global position matching the shift quantity of the direction Y is also computed, and when the normalized cross-correlation value is computed during the second global position matching, the position that has been shifted to in the Y direction of said shift quantity can be taken as the center, and the template T2 moved in parallel in the direction Y.

Figure 7A:
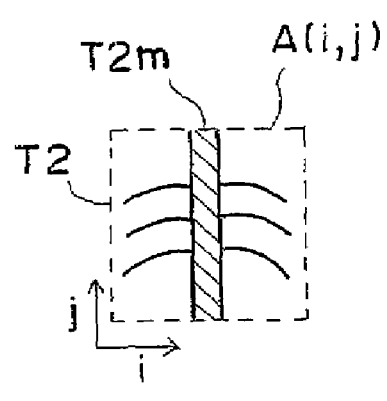
FIGS. 7A and 7B are drawings illustrating the computation of the global shift quantity using a post-costal enhanced image.
Figure 7B:
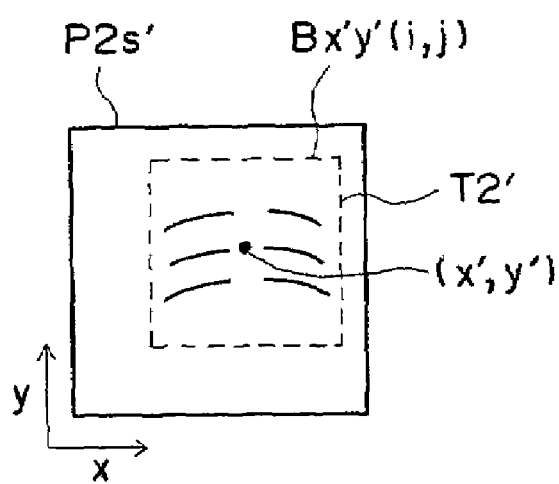

Further, when normalized cross-correlation values are computed using a post-costal enhanced image, it is desirable that a formalized mutual correlation weighting value be used. That is to say, as shown in FIG. 7, the pixel value of each pixel within the template region T2 is designated A (i, j), and the pixel value of each corresponding pixel within the center point coordinate (x, y) of the corresponding template region T2 is designated as Bx' y' (i, j), and the weighting coefficient is designated as w (i, j), the formalized mutual correlation weighting value is computed according to the following Formula (4), and the weighting occurring at the center portion Tm2 [0.4·I<i<0.6·I], in which no shadows of ribs are present, within the template region T2 is made smaller; it is desirable that, for example, w (i, j)=0.5, and that for other portions, w (i, j)=1.0.

$$Cx'y' = \sum_{j=1}^{J} \sum_{i=1}^{I} \frac{w(i, j)\{A(i, j) - a_m\}\{Bx'y'(i, j) - b_m\}}{\sigma_a \cdot \sigma_b} \qquad (4)$$

Wherein:

$$a_m = \frac{1}{I \cdot J} \sum_{j=1}^{J} \sum_{i=1}^{I} A(i, j)$$

$$b_m = \frac{1}{I \cdot J} \sum_{j=1}^{J} \sum_{i=1}^{I} Bx'y'(i, j)$$

$$\sigma_a^2 = \frac{1}{I \cdot J} \sum_{j=1}^{J} \sum_{i=1}^{I} w(i, j)\{A(i, j) - a_m\}^2$$

$$\sigma_b^2 = \frac{1}{I \cdot J} \sum_{j=1}^{J} \sum_{i=1}^{I} w(i, j)\{Bx'y'(i, j) - b_m\}^2$$

For cases in which the bone tissue structure position matching function has been selected at the position matching function selecting means 13, the image transforming means 16 performs, based on the computed second global shift quantity (b), an affine transform on the past image P1, and forms a past image P1', in which the positions of the bone tissue structures have been mainly focused on and globally matched to those in the current image P2.

Note that according to the embodiment described above, when the global position matching means 10 is computing the normalized cross-correlation value, the formalized mutual correlation weighting value has been used only when the bone tissue structures position matching function has been selected as the position matching process; however, the formalized mutual correlation weighting value is not a value capable of being employed only for cases in which the global position matching is performed in a manner focusing mainly on the bone tissue structures; an appropriate weighting coefficient can be set in the case in which the non-bone tissue structure position matching function, or the like, has been selected as the position matching process, and the formalized mutual correlation weighting value employed.

Further, according to the embodiment described above, because chest X-ray images have been used as the images subjected to the position matching processes, when the second global shift quantity (b) has been obtained according to the bone tissue structures position matching function, although only the shift quantity in the direction Y (the direction substantially parallel to the spinal column) has been obtained by focusing on the bone tissue structures (matched to the ribs), the image position matching method and apparatus according to the present invention is not limited to this embodiment; the shift quantity occurring in a bone tissue structures position matching process for the direction of change in the positions of the bone tissue structures of two images, between which the positions of the bone tissue structures differ (are misaligned) due to changes in the posture of the patient at the time of the obtainment of the images may also be employed.

Figure 8:
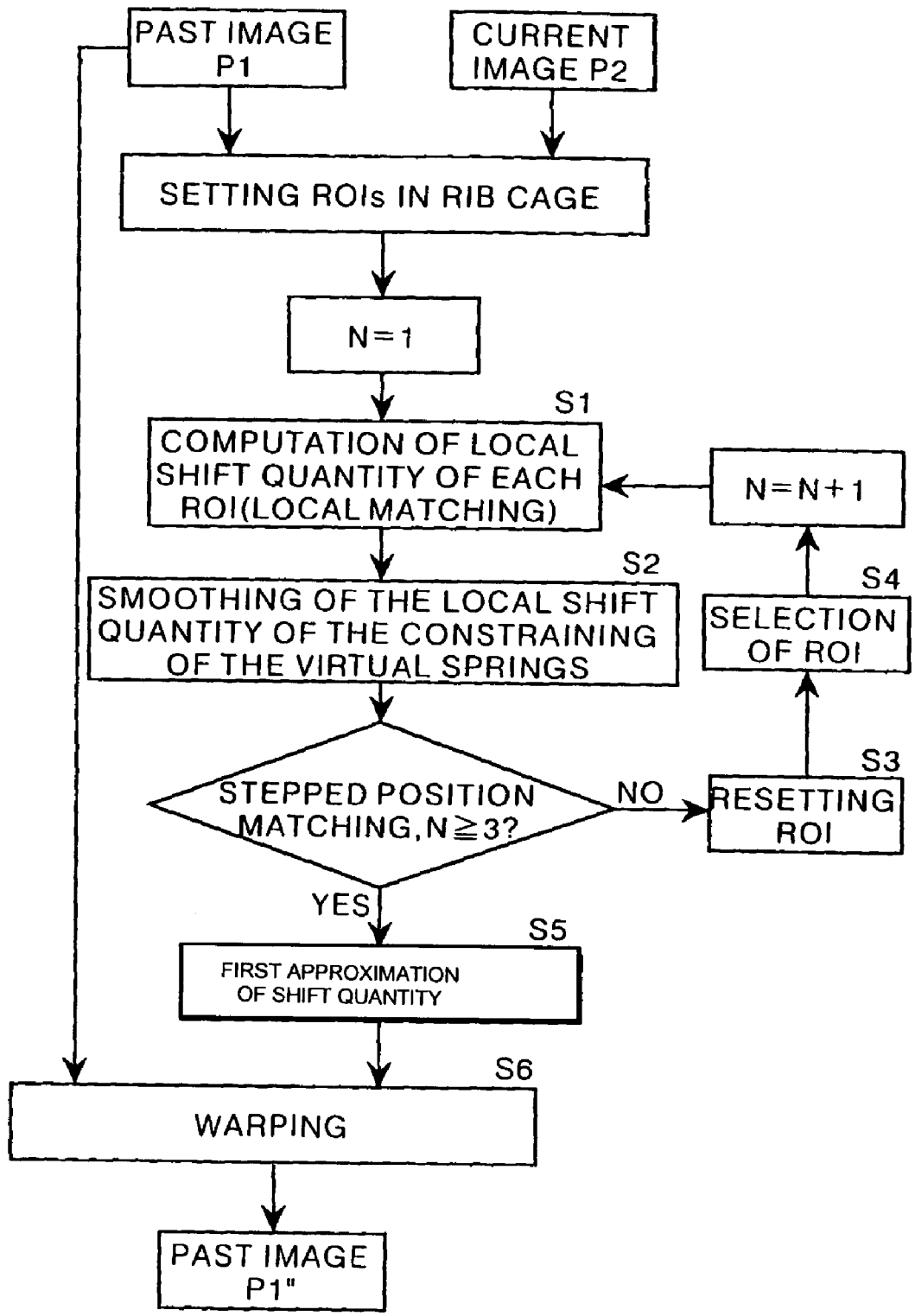
FIG. 8 is a flowchart showing the details of the local position matching process.

Next, the local position matching process performed by the local position matching means 20 of the image position matching apparatus 1 according to the current embodiment will be explained. FIG. 8 is a flowchart of the local position matching process according to the current embodiment.

Upon the input of the past image P1', which has been subjected to an affine transform, and the current image P2, first, a plurality of local regions (ROI: Region Of Interest) are set within the outline of the rib cage included in each of images P1' and P2, and a local matching, wherein a local shift quantity of each ROI is computed, is performed (step S1). Note that the position of the outline of the rib cage in both the images P1' and P2 can be discerned by use of one of a number of various rib cage outline detecting technologies (see, for example, Japanese Unexamined Patent Publication No. 8(1997)-335271, etc.). Further, after the local shift quantity of each ROI has been smoothed by the constraining force of a virtual spring (step S2), the size of the ROI of both the images P1' and P2 is reduced by one step and said ROI are reset (step S3), the ROI having a high degree of positional misalignment from among the reset ROI are selected (step S4), and said selected ROI are subjected to a further local matching. The ROI that have been subjected to this further local matching are then repeatedly subjected to of the processes starting with S2, and after the local matching process has been performed again and the third smoothing of the local shift quantity by the constraining force of the virtual spring completed, a first approximation of the local shift quantity is performed and the past image P1' is subjected to a non-linear transform process (warping), and a past image P1" that has been matched to the current image P2 is formed thereby. Hereinafter, a detailed explanation of the local position matching process will be provided.

Step S1: Computing the Local Shift Quantity of Each ROI (Local Matching).

Figure 9A:
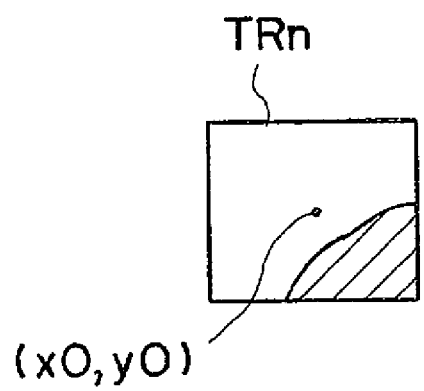
FIGS. 9A and 9B are drawings illustrating the corresponding relationship between the first template region TRn, the first search region RRn, and the first portion region tRn.
Figure 9B:
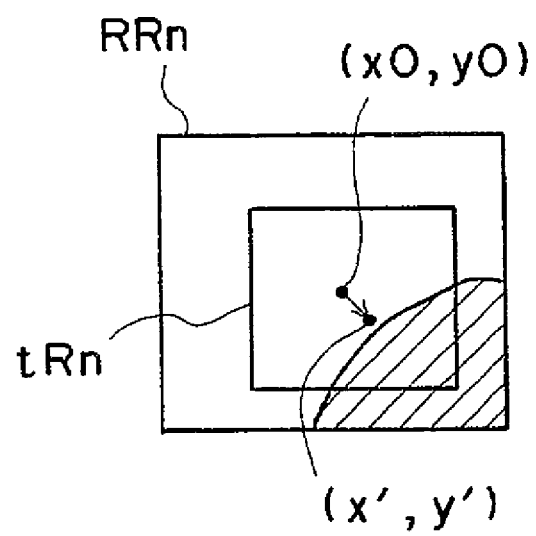

FIG. 9 is a drawing illustrating the operation occurring when the local shift quantity, for the local matching of each ROI, of each ROI is computed. A plurality of 90 pixel high by 90 pixel wide rectangular regions centered on a point (x0, y0) is set as are set as a first template ROITRn (n=11, 12, ..., 21, 22, ...), which is set at a 90 pixel step (the interval between the center position of adjacent ROI) within the rib cage portion of the past image P1', from among the two images P1' and P2 that have been subjected to the global position matching process, and a 160 pixel by 160 pixel rectangular shaped first search ROIRRn (n=11, 12, ... 21, 22, ...), which is larger than the first template ROITRn and has the same center point (x0, y0) as said first template ROITRn, is set within the present image P2. For each group formed of a mutually corresponding first template ROITRn and first search ROIRRn, the portion region having the highest degree of matching (for example, by using the formalized mutual correlation value as an index) with the image of the first template POITRn is obtained as a first portion region tRn (n=11, 12, ... 21, 22, ...) within the first search ROIRRn. Then, a first positional relation, which is the corresponding positional relation between each first template ROITRn and each first portion region tRn, is obtained, and based on this first positional relation, the first local shift quantity, which is the movement quantity (+Δx, +Δy) required to match the first template ROITRn and the first portion region tRn, is obtained.

If, for example, the center position of the first portion region tRn is designated as (x', y'), the first local shift quantity (+Δx, +Δy) can be expressed as:

(+Δx, +Δy)=(x'−x0, y'−y0)

Step 2: Smoothing of the Local Shift Quantity by the Constraining Force of a Virtual Spring After the first local shift quantity of each ROI has been computed, the first local shift quantity of each ROI is smoothed by the constraining force of a virtual spring, based on the first local shift quantity of the ROI group in the surrounding vicinity of each ROI, and a first post virtual spring constraint local shift quantity (+Δx, +Δy) is obtained.

Figure 10:
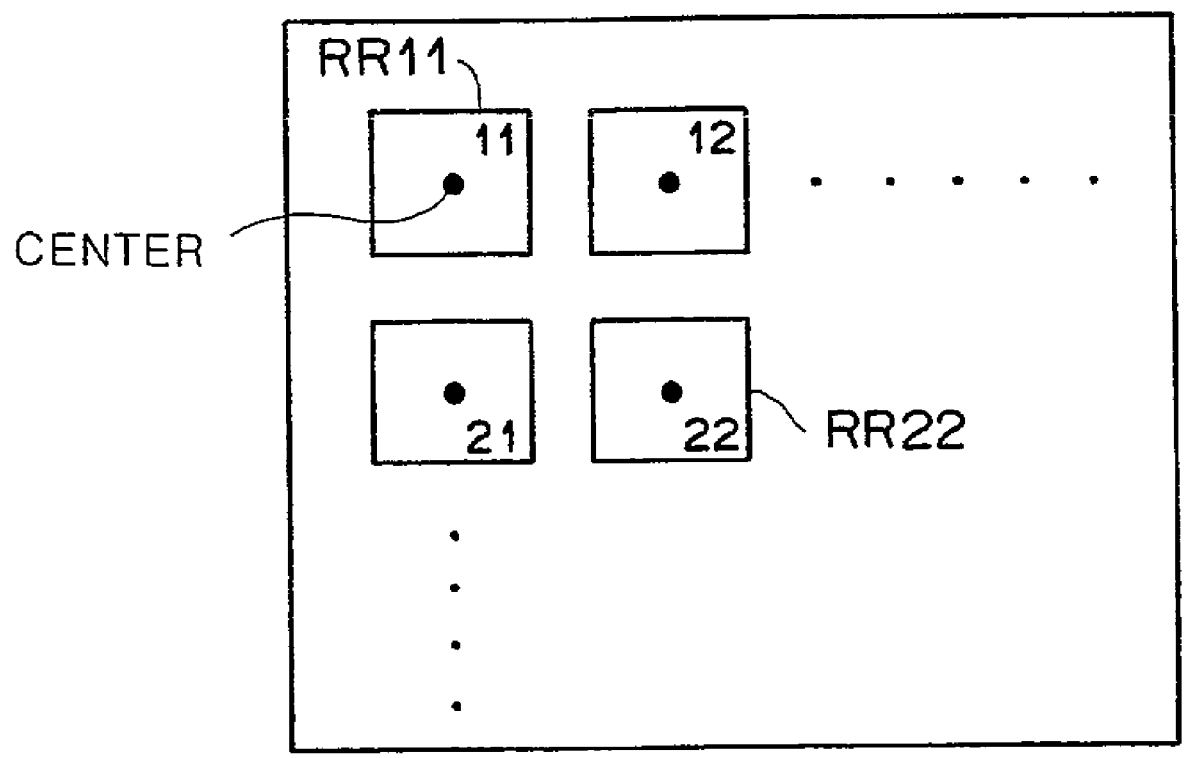
FIG. 10 is a drawing showing each search region ROI within the current image P2.
Figure 11:
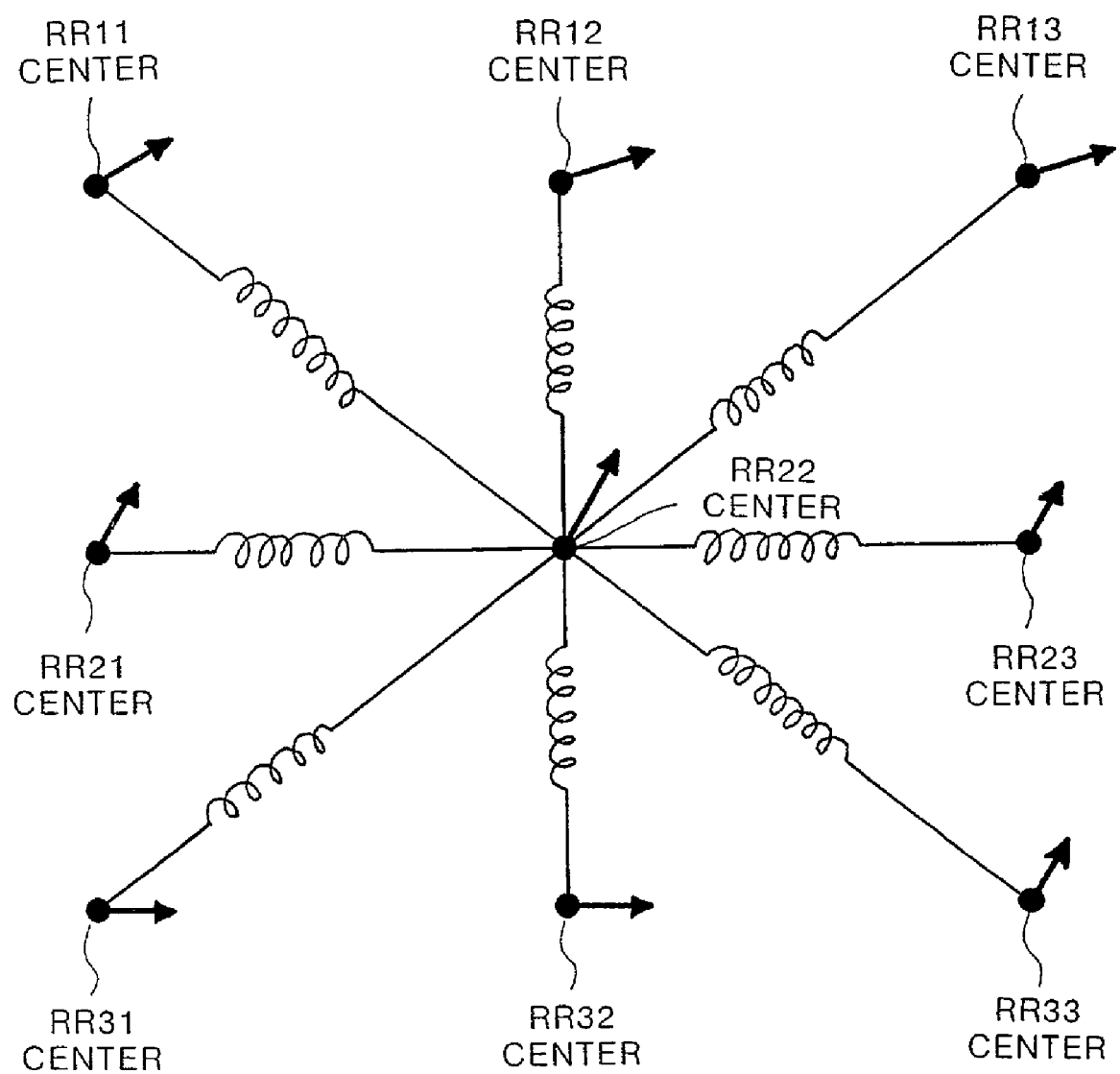
FIG. 11 is a drawing illustrating the concept of the shift vector of each peripheral search region ROI and the shift vector of the central search region ROI, which are shown constrained by the virtual springs.

That is to say, as shown in FIG. 10, if the first search ROIRRn are designated as RR11, RR12, ... RR21, RR22, ..., in order from the upper left corner, the local shift quantity (shift vector) of the first search ROIRR22, for example, is bound by the first local shift quantity (shift vector) of each search ROI in a one layer deep group of the peripheral search ROI centered on the ROIRR22 (here, the eight search ROI: RR11, RR12, RR13, RR21, RR23, RR31, RR32, RR33) and the virtual spring, and converged on the position at which the force of the shift vector of each search ROI and the constraining force of each virtual spring is balanced; based on this position, the first post virtual spring constraint local shift quantity of the search ROIRR22 is obtained (refer to FIG. 11).

More specifically, if the shift vector of the first search ROIRR22, which is the center region, is designated as (x, (i, j), y (i, j)), the shift vector of each peripheral first search ROI is designated as (x, (i+k, j+1), y (i+k, j+1)), and the virtual spring coefficient of each virtual spring between the shift vector of the first search ROIRR22, which is the center region, and the shift vector of each peripheral first search ROI is designated as a (k, l), the corrected quantity ((Δx, (i, j), (Δy, (i, j)) of shift vector of said first search region ROIRR22 occurring at the position at which the constraining force of each virtual spring and the force of each shift vector are balanced can be derived by the following formula:

$$\Delta x(i, j) = \sum_{k,l}^{N_c} [a(k, l) \times \{x(i+k, j+l) - x(i, j)\}] \quad (5)$$

$$\Delta y(i, j) = \sum_{k,l}^{N_c} [a(k, l) \times \{y(i+k, j+l) - y(i, j)\}] \quad (6)$$

Here, Nc is the number of individual peripheral search ROI, (eight in a single layer, 24 in a double layer, etc.); further, the spring coefficient a (k, l) is generally set larger between nearer ROI and smaller between more distant ROI.

The shift vector corrected quantity derived by use of the preceding formula is computed for all of the search ROIRRn, taking each said search ROIRRn as the center region, and the shift vector of each search ROIRRn is renewed according to the following formula:

$$nx(i,j) = x(i,j) + b \cdot \Delta x(i,j) \quad (7)$$

$$ny(i,j) = y(i,j) + b \cdot \Delta y(i,j) \quad (8)$$

Wherein: the constant, b is defined by (0<b≦1)

Here, (nx (i, j), ny (i, j)) represent the renewed shift vectors.

The renewal of the shift vectors is repeated until the counter pulling forces between the shift vectors of the peripheral ROI converge, and the shift vector obtained as a final result is taken as a first post virtual spring constraint local shift quantity (+Δx, +Δy) for each search ROIRRn and corresponding template ROITRn. As to the determination as to whether or not convergence has occurred, said determination can be made based on at least one of the following determination standards (1)-(3). Note that in accordance with the size of the number of times the process is required to be repeated, the number Nc of peripheral ROI can be reduced.

(1) If the sum of the size of the new shift vector becomes less than a predetermined threshold value th1, the repetition is completed; that is:

$$\sum \{(nx(i, j))^2 \times (ny(i, j))^2\} = \text{Shift mag} < th1$$

(2) If the change in the sum of the size of the new shift vector becomes less than a predetermined threshold value th2, the repetition is completed; that is:

Shift mag($t$)−Shift mag($t$−1)<th2

(3) If the number of times t the process has been repeated reaches a predetermined threshold value th3, the repetition is completed; that is:

t<th3

Note that the processing performed up to here constitutes the first step of processing in a stepped position matching process.

In the same manner as has occurred up to here, by balancing the counter pulling force due to the constraining force of the virtual springs between the shift vector of each search ROIRRn and the shift vector of the peripheral search ROIRRn, because the shift vectors can be smoothed, even if the shift vector of the search ROIRRn is oriented in a completely different direction from the shift vectors of the peripheral ROI, if the shift quantity thereof becomes large, or if the shift vector of said search ROIRRn sticks out due to other reasons, these phenomenon can be suppressed and the forces of the shift vectors made to converge.

Step 3: Resetting the ROI

After the first local shift quantity has been smoothed by the constraining force of the virtual spring and the first post virtual spring constraint local shift quantity has been computed, the size of each ROI is reduced and each of said ROI is then reset. More specifically, as shown in FIGS. 1 and 2: a 48 pixel high by 48 pixel wide pixel rectangular shaped second template ROITR'n, which is a step 48 pixel block centered on the original center position (x0, y0), is set in the past image P1'; and a 78 pixel high by 78 pixel wide pixel rectangular shaped second search ROIRR'n, which is larger than the second template ROITR'n and smaller than the first search ROIRRn and has a center position (x', y') (=(x0+Δx, y0+Δy), which is the position to which the center position (x0, y0) of the first portion region tRn has been moved, based on the first post virtual spring constraint local shift quantity (+Δx, +Δy), by a displacement of only the first post virtual spring constraint local shift quantity (+Δx, +Δy), is set in the current image P2.

Step 4: Selection of the ROI Having a High Degree of Positional Misalignment

Next, only the groups of second template ROITR'n and second search ROIRR'n, from among the groups of second template ROITR'n and second search ROIRR'n that have been reset in the ROI resetting process performed in step S3, which have a high degree of positional misalignment are selected. More specifically, the sum Ds of the absolute values of the differences (hereinafter referred to as the total difference Ds) between the pixel value of each pixel of the second search ROIRR'n, at the center position of the second search ROIRR'n, and the pixel value of each corresponding pixel of the second template ROITR'n corresponding to said second search ROIRR'n is obtained as an index representing the degree of matching between each corresponding pair of ROI. The obtained total difference Ds is compared to a preset threshold value T, and ROI for which the total difference Ds is larger than the threshold value T are selected as ROI having a high degree of positional misalignment. That is to say, if the pixel values of the pixels within the ROI occurring in the past image P1' are designated as A (i, j), and the pixel values of the pixels within the ROI occurring in the current image P2' are designated as B (i, j), the total difference Ds is expressed by the equation: ΣΣ|A(i, j)−B(i, j)|; only ROI for which the Ds>T are selected as ROI having a high degree of positional displacement, and only said selected ROI are again subjected in sequence to the local position matching process starting from step S1.

After the processes of the steps S1-S4 have been performed as described above, the ROI selected in the step S4 are subjected to further processing: the second portion region tR'n, within the second search ROIRR'n, of which the degree of matching (as indicated, for example, by a formalized correlation value) with the image of the second template ROITR'n is highest, is obtained of each group formed of a mutually corresponding second template ROITR'N and second search ROIRR'n; the a a second positional relation, which is the positional relation of the second template ROITR'n to each second portion region tR'n, is obtained; and a second post spring constrained local shift quantity (+Δx', +Δy'), which is the movement quantity for matching, based on the obtained second positional relation, the second template ROITR'n and the second portion region tR'n, is obtained (step S1).

Figure 12A:
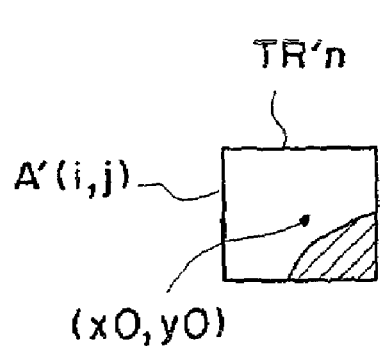
FIGS. 12A and 12B are drawings illustrating the corresponding relations between the second template region TR'n, the second search region RR'n, and the second portion region tR'n.
Figure 12B:
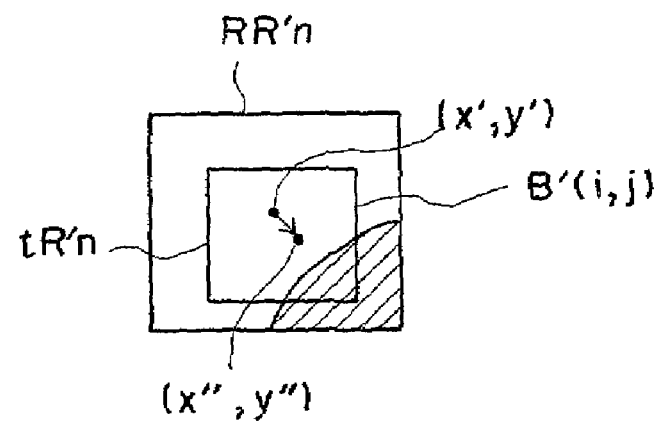

For example, as shown in FIG. 12, the interior of a second search ROIRR'n (center position (x', y')) corresponding to a second template ROITR'n (center position (x0, y0) is searched, and if the center position of the second portion region tR'n having the highest degree of matching is designated as (x", y"), the second post spring constrained local shift quantity (+Δx', +Δy') becomes expressed by:

$$(+\Delta x', +\Delta y') = (x'' - x', y'' - y')$$
$$= (x'' - x0 - \Delta x, y'' - y0 - \Delta y)$$

Further, the shift vectors of the ROI that have been subjected to the further local position matching are smoothed by the constraining force of the virtual spring occurring in step S2, and the second post spring constraint local shift quantity (+Δx', +Δy') is obtained. Note that the processing up to here constitutes the second step processing of the stepped position matching process.

Next, the ROI of which the second post spring constraint local shift quantity (+Δx', +Δy') is to be computed are subjected to the ROI resetting process occurring in step S3. Here, a 48 pixel high by 48 pixel wide pixel rectangular shaped third template ROITR'n, which is a step 48 pixel block centered on the original center position (x0, y0), is set in the past image P1'; and a 58 pixel high by 58 pixel wide pixel rectangular shaped third search ROIRR"n, which is larger than the third template ROITR"n and smaller than the second search ROIRR'n and has a center position (x", y") (=(x0+Δx, y0+Δy), which is the position to which the center position (x', y') of the first portion region tRn has been moved, based on the second post virtual spring constraint local shift quantity (+Δx', +Δy'), by a displacement of only the first post virtual spring constraint local shift quantity (+Δx', +Δy'), is set in the current image P2.

Here, only the group formed of a mutually corresponding third template ROITR"n and third search ROIRR"n having the highest degree of positional misalignment, from among the groups formed of mutually corresponding third template ROITR″n and third search ROIRR″n, is selected according to the same method as occurred in step S4, and a third iteration of the local position matching process is performed on said selected ROI group in the same manner as occurs in step S1, and a third post spring constrained local shift quantity (+Δx″, +Δy″) is obtained.

For example, the interior of a third search ROIRR″n (center position (x″, y″)) corresponding to a third template ROITR″n (center position (x0, y0) is searched, and if the center position of the third portion region tR′n having the highest degree of matching is designated as (x°, y°), the third post spring constrained local shift quantity (+Δx″, +Δy″) becomes expressed by:

$$(+\Delta x'', +\Delta y'') = (x° - x'', y° - y'')$$
$$= (x° - x0 - \Delta x - \Delta x', y° - y0 - \Delta y - \Delta y')$$

Further, the shift vectors of the ROI that have been subjected to the third iteration of the local position matching process are smoothed by the constraining force of the virtual spring occurring in step S2, and the third post spring constrained local shift quantity (+Δx″, +Δy″) is obtained. Note that the processing up to here constitutes the third step processing of the stepped position matching process.

Step 5: Making the First Approximation of the Shift Quantity

As described above, a first approximation of the shift quantity is performed and the shift quantity occurring for each pixel is computed, based on the first through third post spring constrained local shift quantities computed for each ROI. That is to say: a first post spring constrained local shift quantity is computed for ROI of which only a first post spring constrained local shift quantity has been computed; a second post spring constrained local shift quantity is computed for ROI of which up to a second post spring constrained local shift quantity has been computed; and a third post spring constrained local shift quantity is employed as the shift quantity (+Δxn, +Δyn) of the center of each template ROITRn of which up to a third post spring constrained local shift quantity has been computed; based on this shift quantity (+Δxn, +Δyn), the shift quantity of all of the pixels within each ROI within the past image P1′ is obtained by use of a linear interpolation process, which utilizes, for example, the shift quantity of four adjacent points (the center point of each ROI). Note that a computation other than the linear interpolation (e.g., a spline interpolation, a Beje interpolation, a NURBS interpolation (a weighted B spline interpolation) or the like) can also be employed. Further, the number of adjacent points on which the interpolation computation is employed is not limited to being four points; for example, according to the type of interpolation to be used, sixteen adjacent points, or the like, may be set as is appropriate.

Figure 13:
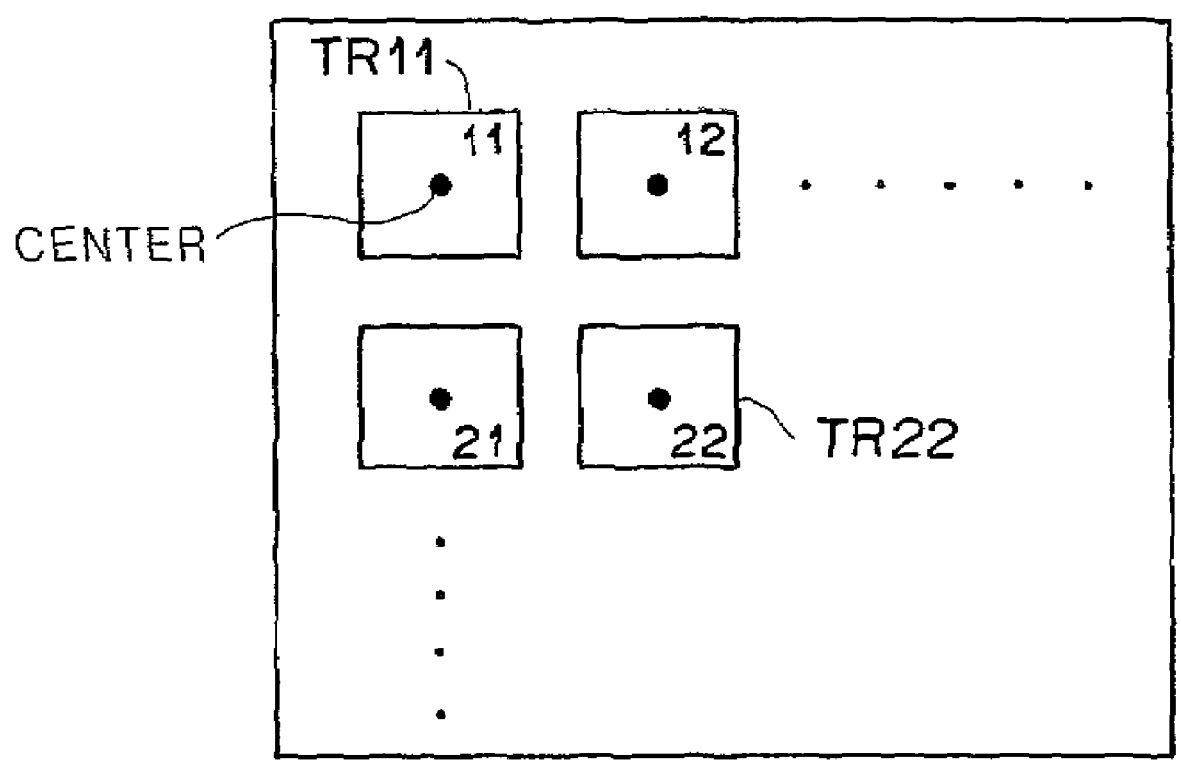
FIG. 13 is a drawing showing each search region ROI within the past image P1'.
Figure 14:
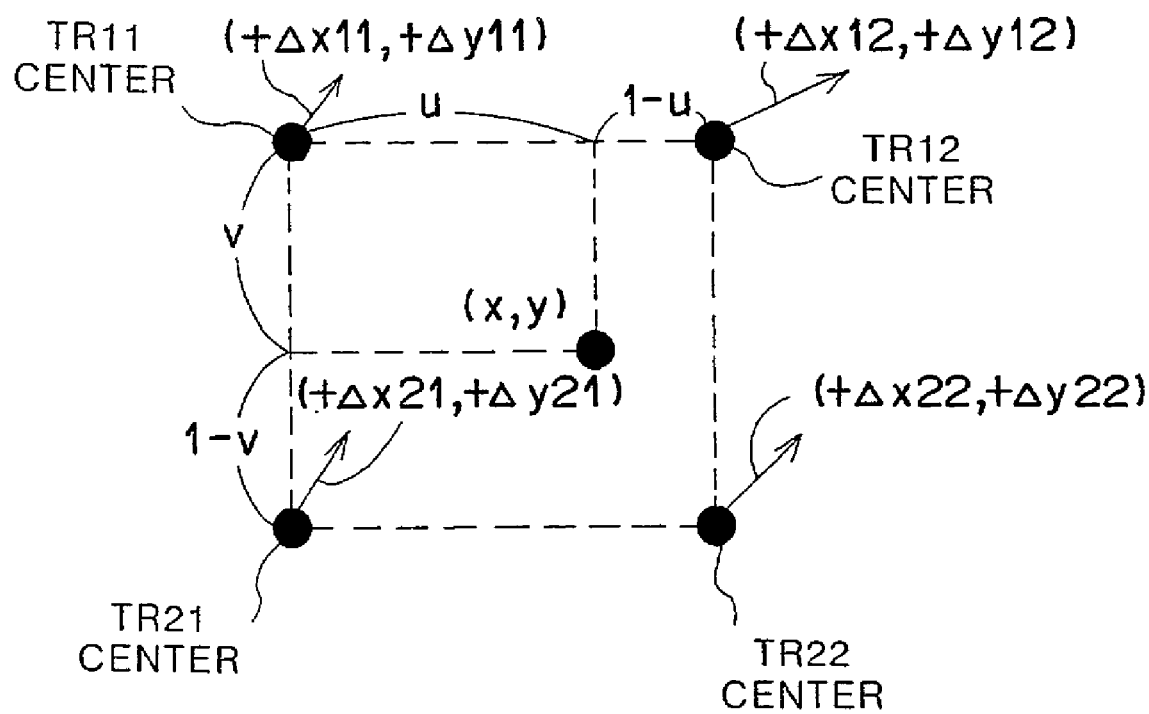
FIG. 14 is a drawing illustrating a linear correction, which is performed using four adjacent points.

As shown in FIG. 13, if the template ROITRn are designated as TR11, TR12″, . . . TR21, TR22, . . . , from the upper left corner, the shift quantity of the center of the template region TR11 is, as described above, expressed by (+Δx11, +Δy11): template region TR12, (+Δx12, +Δy12); template region TR21, (+Δx21, +Δy21); template region TR22, (+Δx22, +Δy22). The shift quantity (+Δx(x), +Δy(y)) of each pixel (x, y) present within the range enclosed by the center points of these four template regions TR11, TR12, TR22, and TR22, as shown in FIG. 14, can be obtained by applying a linear interpolation computation occurring in a two-dimensional plane:

$$\Delta x(x) = (1-u)(1-v)\Delta x11 + u(1-v)\Delta x12 + (1-u)v\Delta x21 + uv\Delta x22$$

$$\Delta y(y) = (1-u)(1-v)\Delta y11 + u(1-v)\Delta y12 + (1-u)v\Delta y21 + uv\Delta y22$$

Step 6: Warping

By moving each pixel within the past image P1′ to perform warping, based on the shift quantity (+Δx(x), +Δy(y)) computed for each pixel (x, y) in step S5, a past image P1″, in which the structural positions have been locally matched to the current image P2, can be obtained.

Note that for the sake of simplicity, the embodiment described above has been explained using an example wherein in every stage of the stepped position matching process the local shift quantities have been smoothed by use of the constraining force of a virtual spring; however, the present invention is not limited to this embodiment. In particular, because there are cases in which the accuracy of positional matching is deteriorated by the smoothing by the virtual spring occurring in the third stage, it is desirable that the smoothing of the local shift quantities by the virtual spring not be performed in the third stage. In this case, in performing the first approximation of the shift quantity occurring in step S5, the third local shift quantity can be employed instead of the third post spring constraint local shift quantity.

According to the current embodiment of the image position matching method and apparatus, because it is possible to select, in accordance with the diagnostic objective, between a bone tissue structures position matching process and a non-bone tissue position matching process and the global position matching process can be performed according to the selected position matching process, the bone tissue structures position matching process is selected when a diseased portion present in the bone tissue structures is to be extracted, and the non-bone tissue position matching process is selected when a diseased portion present in the soft tissue structures is to be extracted, whereby an accurate subtraction image in which the structural positions have been efficiently matched according to the diagnostic objective, or the like can be obtained.

Further, according to the local position matching process, by combining a stepped position matching process with the smoothing of the shift quantities by use of the constraining force of a virtual spring, it becomes possible to maintain a high degree of accuracy with respect to the position matching and the number of times warping is performed can be kept to once, further, by selecting the ROI having a high degree of positional misalignment when performing the re-position matching process, deteriorations to the accuracy can be prevented, and a reduction in the computation time can be realized.

What is claimed is:

1. An image position matching method comprising the steps of
   subjecting two images obtained of the same subject to a global matching process that matches the structural positions of the entirety of said two images, and
   further subjecting said two images thus globally matched to a local position matching process, wherein
   a selection is made between a position matching process focusing mainly on the bone tissue structures and a position matching process not focusing mainly on the bone tissue structures appearing in said two images, and the global position matching is performed according to the selected position matching process, wherein the two images are original temporal sequential obtained images of the same subject.

2. An image position matching method as defined in either of claim 1, wherein
the position matching process focusing mainly on the bone tissue structures is a process performed using a bone tissue structure image representing mainly the bone tissue structures appearing within the images.

3. The method of claim 1, wherein the position matching focusing mainly on bone tissue structures comprises determinations of a first global value and a second global shift F value determined in sequence.

4. The method of claim 3, wherein the second global shift value is determined after enhancement of the bone tissue structures appearing in the two images.

5. The method of claim 4, wherein the matching position process not focusing mainly on the bone tissue structures passes a result of the determinations of a first global value to an affine transform.

6. An image position matching apparatus comprising
a global position matching means that globally matches the structural positions of the entirety of two images that have been obtained of the same subject, and
a local position matching means that locally matches the structural positions of the two images that have been subjected to the global position matching process by said global position matching means, wherein
the global position matching means is provided with a bone tissue structures position matching function for performing the global position matching process in a manner focusing mainly on the bone tissue structures,
wherein the global position matching means is provided with a non-bone tissue structures position matching function for performing the global position matching process in a manner not focusing mainly on said bone tissue structures, further comprising
a selecting means for selecting between the bone tissue structures position matching function and the non-bone tissue structures position matching function when the global position matching process is to be performed.

7. An image position matching apparatus as defined in claim 6, wherein
the bone tissue structures position matching function of the global position matching process is a function for performing the global position matching process by use of a bone tissue structures image representing mainly the bone tissue structures appearing in the images.

8. An image position matching apparatus as defined in either of claim 6, wherein
the images to be subjected to the image position matching process are chest X-ray images, and
the bone tissue structures position matching function is a function that matches, in the vertical direction of the image, the positions of the ribs appearing within the images.

9. An image position matching apparatus as defined in claim 8, wherein
the bone tissue structure position matching function is a function for performing the global position matching on the ribs by use of a ribs enhanced image, in which the representations of the ribs have been enhanced therein.

10. An image position matching apparatus as defined in claim 9, wherein
the ribs enhanced image is an image formed by use of a mask, which has the same directionality as the ribs within the chest X-ray image, for detecting the linear shadows within said chest X-ray image.

11. An image position matching apparatus as defined in claim 6, wherein
the bone tissue structures position matching function sets a template region in one of the two images,
the normalized cross-correlation value of the pixel value of the pixels of said set template region and the pixel value of each pixel in a portion region, within the other of the two images, corresponding to the template region is computed by separately changing the weighting of the pixel value of each pixel in the set template region in the one image and the pixel value of each pixel in the portion region, within the other of the aforementioned two images, corresponding to the template region, for each of the portion regions within the template region, and
the global matching process for globally matching the positions of the two images is carried out based on said computed normalized cross-correlation value.

12. An image position matching apparatus as defined in claim 6, wherein
the bone tissue structures position matching function sets a template region in one of the two images,
the normalized cross-correlation value of the pixel value of the pixels of said set template region and the pixel value of each pixel in the portion region, within the other of the two images, corresponding to the template region is computed by increasing the amount of the weighting of the portion regions in which the shadows of the ribs included in the template region are present, and reducing the amount of the weighting of the portion regions of the template region in which the shadows of ribs included in a template region are not present, and
the global matching process for globally matching the positions of the two images is carried out based on said computed normalized cross-correlation value.

13. The apparatus of claim 6, wherein the global position matching means determines a first global value and a second global shift value in sequence.

14. The apparatus of claim 13, wherein the second global shift value is determined after enhancement of the bone tissue structures appearing in the two images.

15. The apparatus of claim 6, wherein the matching position process not focusing mainly on the bone tissue structures passes a result of the determinations of a first shift global value to an affine transform.

* * * * *